United States Patent [19]

Peterson et al.

[11] Patent Number: 4,490,485

[45] Date of Patent: Dec. 25, 1984

[54] MANUFACTURE OF FLEXIBLE POLYURETHANE FOAM CONTAINING A CONDENSATION PRODUCT OF POLYETHYLENE TEREPHTHALATE

[75] Inventors: Bruce W. Peterson; George P. Speranza, both of Austin; Robert A. Grigsby, Jr., Georgetown, all of Tex.

[73] Assignee: Texaco Inc., White Plains, N.Y.

[21] Appl. No.: 592,653

[22] Filed: Mar. 23, 1984

[51] Int. Cl.$^3$ ............... C08G 18/14; C08G 18/42; C08G 18/48

[52] U.S. Cl. .......................... 521/48; 521/163

[58] Field of Search ................... 521/48, 163

[56] References Cited

U.S. PATENT DOCUMENTS

| | | | |
|---|---|---|---|
| 3,838,076 | 9/1974 | Moss et al. | 521/163 |
| 4,128,525 | 12/1978 | Yeakey et al. | 524/602 |
| 4,167,498 | 9/1979 | Waddill | 523/414 |
| 4,193,896 | 3/1980 | Cook | 521/48 |
| 4,296,213 | 10/1981 | Cuscurida et al. | 521/163 |
| 4,433,067 | 2/1984 | Rice et al. | 521/163 |
| 4,444,910 | 4/1984 | Rice et al. | 521/163 |

FOREIGN PATENT DOCUMENTS 2531094 1/1976 Fed. Rep. of Germany ........ 521/48

*Primary Examiner*—Herbert S. Cockeram

*Attorney, Agent, or Firm*—Jack H. Park; Kenneth R. Priem

[57] ABSTRACT

Flexible polyurethane foams having improved physical properties are prepared by reacting a polyol with an excess of an aromatic polyisocyanate in the presence of a Condensation Product having the formula:

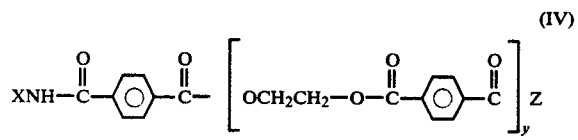

(IV)

where
X represents:

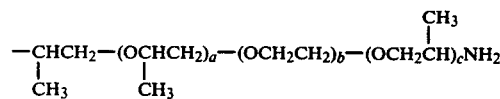

z represents NHX or —OCH$_2$CH$_2$OH,
y is a number between 0 and about 4,
a+c equal about 2 to 10, and
b is a number having a value of about 1 to about 50.

5 Claims, No Drawings

MANUFACTURE OF FLEXIBLE POLYURETHANE FOAM CONTAINING A CONDENSATION PRODUCT OF POLYETHYLENE TEREPHTHALATE

BACKGROUND OF THE INVENTION

1. Technical Field of the Invention

This invention relates to Condensation Products useful in the manufacture of flexible polyurethane foam. More particularly, this invention relates to the preparation of Condensation Products from a particular class of polymeric diamines and polyethylene terephthalate and to the use of the thus prepared Condensation Products in the manufacture of flexible polyurethane foam.

The invention is based upon the discovery that certain water soluble polymeric poly(oxypropylene-oxyethylene-oxypropylene) diamines, as herein defined, which can be reacted with scrap polyethylene terephthalate to provide condensation products, can be used in the manufacture of flexible polyurethane foam. It is also based upon the discovery that the use of such Condensation Products results in the formation of flexible urethane foam having improved physical properties.

2. Prior Art

When terephalic acid is reacted with a diamine, the representative reaction product is a water-insoluble liquid. When terephthalic acid (normally in the form of the dimethyl ester, dimethyl terephthalate, is reacted with a glycol such as ethylene glycol, water-insoluble polymers are formed, characterized by the formula:

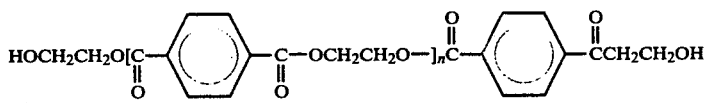

wherein n is a number having a value of about 50 to about 500.

It is known to react dibasic acids such as adipic acid, azelaic acid, terephthalic acid, polymers of fatty acids, etc. with diamines of the formula:

wherein x is a number having a value of 0 to 4 to form reaction products useful in the preparation of coatings and adhesives as shown, for example, by U.S. Pat. No. 4,128,525 and U.S. Pat. No. 4,167,498.

An extensive body of technical knowledge has arisen relating to the preparation of solid polyethylene terephthalate from suitable monomers such as ethylene glycol and dimethylterephthalate.

Polyethylene terephalate is widely used in the manufacture of beverage bottles. The disposal of used bottles in an environmentally acceptable manner presents a major problem. One proposed solution has been to convert the used polymer into an unsaturated polyester that can be used to make moldings such as boat hulls (Plastics Technology, September 1981). The used bottles are reported to have been used as raw materials in the manufacture of industrial strappings, fiber fill for pillows, sleeping bags and the like, synthetic lumber and corrugated rubber (C&E News, Jan. 5, 1981, p. 30).

Polyoxypropylene polyether polyols are widely used in the preparation of flexible polyurethane foam by the reaction of the polyol with an organic polyisocyanate in the presence of a catalyst and other conventional ingredients, such as blowing agents, foam stabilizers, etc.

As shown, for example, by Cuscurida et al. U.S. Pat. No. 4,296,213, it is known to use low molecular weight hydroxy amines for the preparation of chain extenders for use in flexible polyurethane foam. In accordance with the Cuscurida et al. patent, the low molecular weight hydroxy amine is initially reacted with a minor amount of an organic polyisocyanate in the presence of a polyoxypropylene polyether polyol to form a polymer polyol which is thereafter used as a chain extender in the manufacture of a flexible polyurethane foam.

RELATING COPENDING PATENT APPLICATIONS

Copending coassigned Seperanza et al. U.S. patent application Ser. No. 06/592,650 filed Mar. 23, 1984 (of an even date herewith) (Docket No. 80,270) and entitled "Water Soluble Polyethylene Terephthalate Derivatives" discloses water soluble products prepared by dissolving scrap polyethylene terephthalate in water soluble poly(oxypropylene-oxyethylene-oxypropylene) diamines having the following formula:

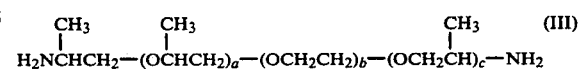

wherein $a+c=2$ to 10 and b is a number having a value of about 1 to 50.

As disclosed therein, the water soluble polyethylene terephthalate derivatives are condensation products having the formula:

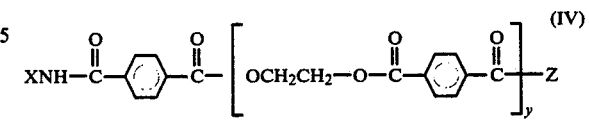

where
X represents:

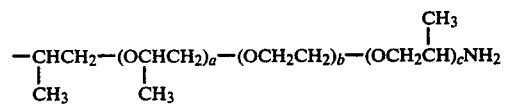

Z represents NHX or $-OCH_2CH_2OH$,
y is a number between about 0 and about 4,
$a+c$ equals about 2 to 10, and
b is a number having a value of about 1 to about 50.

Copending coassigned Sellstrom et al. U.S. patent application Ser. No. 510,696 filed July 5, 1983 and entitled "Novel Amine Curing Agents and Epoxy Resins Cured Therewith" discloses the curing of epoxy resins with compositions prepared by first dissolving polyethylene terephthalate in the amine curing agent and using the resultant composition to cure an epoxy resin.

SUMMARY OF THE INVENTION

The present invention is directed to the use in the manufacture of flexible polyurethane foam of Condensation Products derived from polyethylene terephthalate (preferably scrap polyethylene terephthalate) and a particular class of poly(oxypropylene-oxyethylene-oxypropylene) diamines to provide Condensation Products having the following formula:

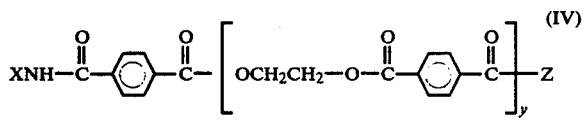

where
X represents:

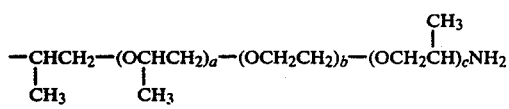

Z represents NHX or —OCH$_2$CH$_2$OH,
y is a number between about 0 and about 4,
a+c equals about 2 to 10, and
b is a number having a value of about 1 to about 50.

DETAILED DESCRIPTION

The Condensation Product

In accordance with the present invention polyethylene terephthalates of formula I above are reacted with water soluble diamines of formula III to provide liquid water soluble condensation products of formula IV.

The polyethylene terephthalate is suitably a solid polymer that has already served its primary purpose as a bottle, a film, etc. In this fashion, environmentally objectionable polyethylene terephthalates can be converted from essentially inert water insoluble materials into useful water soluble products.

The Condensation Products of the present invention are easily prepared by shredding the polymer and adding it to the amine with agitation, at a temperature of about 200° to about 280° C., and more preferably from about 200° C. to abut 250° C. The reaction is preferably conducted in a reaction vessel equipped with agitation and heating means and is preferably conducted in an inert atmosphere such as nitrogen, carbon dioxide, etc. The reaction is not particularly sensitive to pressure and may be conducted at sub-atmospheric or super-atmospheric pressures, if desired, but is preferably conducted at atmospheric pressure. It is preferable to use a molar excess of the amine.

An advantage of the present invention is that polyethylene terephthalates prepared for another purpose (bottles, films, etc.) can be used as starting materials in that additives such as fillers, dyes, pigments, stabilizers, etc. present in the polyethylene terephthalate will not adversely affect the reaction. However, many of these additives are insoluble in the Condensation Products of the present invention and, therefore, should be removed by any appropriate means such as filtration, centrifugation, etc. at the end of the reaction.

The reaction is normally complete within about 2 to 10 hours, but extended reaction times can be used without adverse effect.

Manufacture of Flexible Polyurethane Foam

The components utilized for the manufacture of a flexible polyurethane foam include the Condensation Product of the present invention, a polyol, an organic polyisocyanate, a blowing agent, a surfactant, a catalyst, and other desired additives such as fire retardants, dyes, fillers, etc.

The polyol component in the present invention comprises a polyoxypropyloxyethylene polyether polyol having a hydroxyl number between 20 and 60 and a functionality of 2 to 4.

Normally, propylene oxide will constitute from about 80 to about 100 wt.% of the total polyol composition. Up to about 20 wt.% of ethylene oxide may be utilized if desired, based on the weight of the propylene oxide.

A wide variety of initiators may be alkoxylated to form useful polyoxypropylene polyols. Thus, for example, polyfunctional amines and alcohols of the following types may be alkoxylated: monoethanolamine, diethanolamine, triethanolamine, ethylene glycol, polyethylene glycols, propylene glycols, polypropylene glycols, glycerine, trimethylolpropane, pentaerythritol, etc.

Such above amines or alcohols may be reacted with an alkylene oxide component consisting of 100 to about 80 wt.% of propylene oxide and 0 to about 20 wt.% of ethylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. The polyoxypropylene polyether polyol may be prepared by reacting the initiator with propylene oxide or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyether polyols useful here have a hydroxyl number ranging from about 20 to about 60. The reaction mixture is then neutralized and water and excess reactants are stripped from the polyol.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Methylene-bridged polyphenyl polyisocyanate mixtures which have a functionality of from about 2 to about 4 may also be used. These latter isocyanate compounds are generally produced by the phosgenation of corresponding methylene bridged polyphenyl polyamines, which are conventionally produced by the reaction of formaldehyde with a primary aromatic amine, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The methylene-bridged polyphenyl polyisocyanate mixtures used here may contain from about 20 to about 100 wt.% of methylene diphenyl diisocyanate isomers with the remainder being polymethylene polyphenyl diisocyanates having higher functionalities and higher molecular weights. Typical of these are polyphenyl polyisocyanate mixtures containing about 20 to 100wt.% methylene diphenyl diisocyanate isomers, of which 20 to about 95 wt.% thereof is the 4,4′-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

In the production of flexible polyurethane foams in the practice of the invention, other known additives are used. One such constituent is the blowing agent. Water is normally the preferred blowing agent. All or part of the water may be replaced with an inert blowing agent such as trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

The catalysts which may be used to make the foams are well known. Tertiary amines and organo-metallic compounds are normally preferred.

Examples of suitable tertiary amines, used either individually or in admixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, and methyltriethylenediamine.

Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc.

Selection of the individual catalysts and proportions to use in the polyurethane reaction are well within the knowledge of those skilled in the art, and an amine and organo-metallic compound are often used together in the polyurethane reaction.

Another conventional ingredient that is usually employed is a foam stabilizer. Foam stabilizers are also known as silicone oils or emulsifiers. The foam stabilizer may be an organic silane or siloxane. For example, compounds may be used having the formula:

$$RSi[O-(R\ SiO)_n-(oxyalkylene)_mR]_3 \qquad (V)$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN®101), FYROL®EFF (oligomeric chloroalkyl phosphate, sold by Stauffer Chemical Co.), tricresyl phosphate, cresyl diphenyl phosphate, chlorinated paraffins, and brominated paraffins. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 10 to about 50 parts by weight per 100 parts by weight of polyol in the reaction mixture. It is preferred to use from about 10 to about 20 parts by weight.

The flexible polyurethane foams are preferably made in one step by reacting all the ingredients together (the one-shot process).

The Condensation Products of the present invention may also be used as "polymer polyol" ingredients in the formation of flexible polyurethane foam. Polymer polyols can be prepared by separately adding the Condensation Product to the polyol and reacting the Condensation Product therein with an amount of the organic polyisocyanate sufficient to provide about 1.0 to about 1.1 stoichiometric equivalents of polyisocyanate, based upon the amine content of the Condensation Product.

An advantageous aspect of the present invention is the comparative ease with which flexible polyurethane foams are made in the manner described above when using the polyol compositions of the present invention.

SPECIFIC EXAMPLES

EXAMPLE 1

Preparation of Condensation Product
Jeffamine ED-600 is a product having the formula:

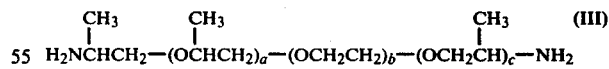

$$\text{H}_2\text{NCHCH}_2-(\text{OCHCH}_2)_a-(\text{OCH}_2\text{CH}_2)_b-(\text{OCH}_2\text{CH})_c-\text{NH}_2 \qquad (III)$$

with CH$_3$ groups on the indicated carbons.

where the approximate value of b is about 13.5 and the approximate value of a+c is about 3.5. A mixture of Jeffamine ED-600 (0.2 mole, 120.0 grams) and green-dyed shredded polyethylene terephthalate chips (0.13 mole, 25.9 grams) were added to a nitrogen flushed reaction vessel. The reactants were heated to 220° C. and held at 220° C. for three hours. A mechanical stirrer was used to provide agitation during the heating period. The light green solution (from the green dye) was cooled to 150° C. and filtered to remove unreacted polyethylene terephthalate and other solids present in the polyethylene terephthalate chips. Upon cooling to room temperature, the Condensation Product that was recovered was a clear, water soluble, light green fluid liquid which would flow easily at room temperature.

Analysis of the green Condensation Product by titration yielded an amine equivalent of 1.06 meq/g and total acetylatables of 2.19 meq/gram.

The yield of the Condensation Product was 144.5 grams or 99.0%.

EXAMPLE 2

Preparation of Condensation Product
Jeffamine ED-900 is a product having the formula:

wherein the approximate value of b is about 20.5 and the approximate value of a+c is about 3.5. A mixture of Jeffamine ED-900 (0.14 mole, 126.0 grams) and green-dyed polyethylene terephthalate chips (0.13 mole, 24.6 grams) were added to a nitrogen flushed reacted vessel. The reactants were heated to 220° C. and held at 220° C. for three hours. After three hours, the temperature of the reaction mixture was increased to 240° C. and held at 240° C. for 1½ hours. A mechanical stirrer was used to provide agitation during the heating period. The light green solution was then cooled to 150° C. and filtered to remove unreacted polyethylene terephthalate and other solids present in the polyethylene terephthalate chips. Upon cooling to room temperature, the Condensation Product that was recovered was a clear, water soluble, light green fluid liquid which would flow at room temperature.

Analysis of the green Condensation Product by titration yielded an amine equivalent of 0.42 meq/gram and a total acetylatables of 1.21 meq/gram.

The yield of the Condensation Product was 148.6 grams or 98.7%.

EXAMPLE 3

Preparation of Flexible Polyurethane Foam
The following data was obtained according to A.S.T.M. procedures on urethane flexible slab foam produced on a 50 lb./min. continuous processing conventional style pilot foam machine.

| | A | B | C |
|---|---|---|---|
| Component | | | |
| Thanol F-3016[1] | 96.0 | 96.0 | 100.0 |
| ED-600/PET | 4.0 | — | — |
| ED-900/PET | — | 4.0 | — |
| Water | 4.0 | 4.0 | 4.0 |
| UCC L-562 Silicone[2] | 0.90 | 0.90 | 0.90 |
| Thancat TD-33[3] | 0.10 | 0.10 | 0.10 |
| Thancat DME[4] | 0.20 | 0.20 | 0.20 |
| Stannous Octoate[5] | 0.30 | 0.30 | 0.38 |
| Toluene Diisocyanate (TDI) | 52.18 | 52.02 | 52.05 |
| Processing Conditions | | | |
| Room Temp., Deg. F | 85 | 90 | 90 |
| Rel. Humidity, Deg. F | 73 | 73 | 73 |
| Polyol Temp., Deg. F | 72 | 73 | 73 |
| TDI Temp., Deg. F | 70 | 69 | 69 |
| Physical Properties | | | |
| Density, pcf | 1.47 | 1.54 | 1.55 |
| IFD, lb/50 sq. in., 25% | 33.5 | 38.0 | 40.5 |
| 65% | 60.0 | 70.0 | 73.5 |
| 25R | 19.9 | 22.0 | 23.5 |
| Compression Set, 50% | 5.5 | | |
| 90% | 5.1 | | |
| Tensile, psi | 11.1 | 14.7 | 17.9 |
| Elongation, % | 130 | 188 | 228 |
| Tear, pii | 1.2 | 2.2 | 3.2 |
| Ball Rebound, % | 40.0 | 42.0 | 40.0 |
| Breathability, scfm | 5.9 | 5.4 | 5.4 |
| 25% IFD Loss, % | 26.1 | 27.0 | 27.9 |
| Hand (Qualitative Test) (poor,fair,normal,good, excellent) | Good | Excellent | Normal |

[1]An adduct of glycerine formed from a mixture of ethylene oxide and propylene oxide with an average molecular weight of about 3000.
[2]Union Carbide Chemical Company.
[3]Texaco Chemical Company; 33% solution of triethylenediamine in polypropylene glycol.
[4]Texaco Chemical Company.
[5]Thermalite T-10; Metal & Thermit Corp.

The term "hand" appearing in the table is a term commonly used in the polyurethane foam industry as a qualitative description of the feel or texture of a polyurethane foam product. It will be observed that the polyurethane foam prepared using the Condensation Products of the present invention had excellent properties in this regard. This may be the result of smaller and more evenly distributed foam cells. The mechanism which produces this fine cell structure may involve the early formation of macromolecules from the Condensation Product and isocyanate during the first few seconds of the foaming process. These macromolecules could serve as cell nucleation sites which, along with their added mechanical strength, would provide a stable environment for cell growth.

It will also be observed from the table that there is an improvement in rebound characteristics for flexible urethane foam prepared using the Condensation Products of the present invention.

The primary amine groups present in the Condensation Product react much more rapidly with the organic polyisocyanate than the conventional primary hydroxyl group. This creates a higher frothing viscosity and greater polymer strength during the early stages of the foaming process. This adds greatly to the stability of the foam during its initial rise and reduces the chance of foam processing splits. Higher frothing viscosity has been shown to be a distinct processing advantage in foam produced on Max-Foam type or other machinery employing the use of fall plates.

It will be understood that the foregoing examples are given by way of illustration only and not by way of limitation and that the scope of the present invention is defined solely by the appended claims.

What is claimed is:

1. A method for preparing a flexible polyurethane foam which comprises:
   (a) reacting a polyoxypropylene polyether polyol and a condensation product of a polyoxyalkylene diamine with polyethylene terephthalate with an excess of an organic polyisocyanate in the presence of a catalyst, a blowing agent and a foam stabilizer,
   (b) said polyoxypropylene polyether polyol having a hydroxyl number between about 20 and 60, a functionality of from about 2 to about 4, a molecular weight within the range of about 2000 to about 8000 and having been prepared by reacting an initiator having a functionality between about 2 to about 4, with an alkylene oxide component consisting of from about 100 to about 80 wt.% of propylene oxide and, correspondingly, from about 20 to 0 wt.% of ethylene oxide, (c) said condensation product having the formula:

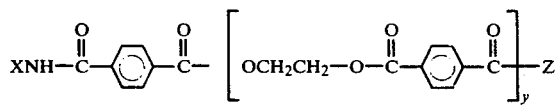

where
X represents:

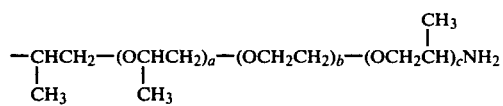

Z represents NHX or —OCH$_2$CH$_2$OH,
y is a number between about 0 and about 4,
a+c equal about 2 to 10, and
b is a number having a value of about 1 to about 50.

2. A method as in claim 1 wherein:
(a) the polyoxypropylene polyether polyol is a polyol having a hydroxyl number of about 1 to 20 and a molecular weight of about 2000 to about 8000, said polyol having been prepared by reacting an initiator having a functionality of 2 to 4 with a polyoxyalkaline component consisting of 100 to about 80 wt.% of propylene oxide and, correspondingly, 0 to about 20 wt.% of ethylene oxide, and
(b) said condensation product constituting about 1 to about 20 wt.% of the polyol component.

3. A method as in claim 2 wherein the aromatic polyisocyanate is tolyuene diisocyanate, wherein the polyol is a triol prepared by propoxylating an initiator having a functionality of about 3 and wherein, in the formula of claim 1, b has a value of about 13.5 and the sum of a+c is about 3.5.

4. A method as in claim 2 wherein the aromatic polyisocyanate is tolyuene diisocyanate, wherein the polyol is a triol prepared by propoxylating an initiator having a functionality of about 3 and wherein, in the formula of claim 1, b has a value of about 20.5 and the sum of a+c is about 3.5.

5. A method as in claim 1 wherein the condensation product is first mixed with the polyoxypropylene polyether polyol and reacted with about 1.0 to about 1.1 stoichiometric equivalents of said polyisocyanate, based upon the amine content of the condensation product to form a polymer polyol, and wherein the polymer polyol is then reacted with the remainder of said polyisocyanate, said catalyst, said blowing agent and said foam stabilizer to form said polyurethane foam.

* * * * *